United States Patent
Qureshi et al.

(10) Patent No.: US 6,769,059 B1
(45) Date of Patent: Jul. 27, 2004

(54) SYSTEM FOR UPDATING COMPUTER'S EXISTING VIDEO BIOS WITHOUT UPDATING THE WHOLE COMPUTER'S SYSTEM BIOS

(75) Inventors: Bilal S. Qureshi, Folsom, CA (US); David (Borislav) Girshovich, Nazareth-Illit (IL); Andrew W. Martwick, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,597

(22) Filed: Dec. 17, 1999

(51) Int. Cl.[7] .................................... G06F 15/177
(52) U.S. Cl. ........................................... 713/2
(58) Field of Search .............................. 713/1, 2, 100, 713/187, 200; 380/255, 277

(56) References Cited

U.S. PATENT DOCUMENTS

| | | | | |
|---|---|---|---|---|
| 5,012,514 A | * | 4/1991 | Renton | 713/192 |
| 5,579,522 A | | 11/1996 | Christeson et al. | |
| 5,689,726 A | * | 11/1997 | Lin | 710/10 |
| 5,835,594 A | | 11/1998 | Albrecht et al. | |
| 5,844,986 A | * | 12/1998 | Davis | 713/187 |
| 5,930,504 A | | 7/1999 | Gabel | |
| 5,964,873 A | * | 10/1999 | Choi | 713/2 |
| 6,009,524 A | * | 12/1999 | Olarig et al. | 713/200 |
| 6,081,891 A | * | 6/2000 | Park | 713/2 |
| 6,401,198 B1 | * | 6/2002 | Harmer et al. | 713/1 |
| 6,425,079 B1 | * | 7/2002 | Mahmoud | 713/2 |

FOREIGN PATENT DOCUMENTS

JP       06075755 A   *   3/1994   ............. G06F/9/06

OTHER PUBLICATIONS

Bob Mento—"Matrox BIOS Update"—Dec. 6, 1997—Newsgroups:alt.sys.pc–clone.gateway2000.*

* cited by examiner

Primary Examiner—Jeffrey Gaffin
Assistant Examiner—Thuan Du
(74) Attorney, Agent, or Firm—Kenyon & Kenyon

(57) ABSTRACT

A computer system's existing video BIOS is updated independently without the need for updating the computer system's entire system BIOS, by transferring a new video BIOS contained on a floppy disk into a flash memory block dedicated for video-BIOS storage. The video-BIOS update mode is entered by initializing the computer and pressing a "hot key sequence" while the computer is being initialized. Once the hot key sequence has been detected, the system BIOS reads the new video BIOS from the floppy disk and performs a security check to ensure that the new video BIOS contained on the floppy disk is known to the system BIOS. The security check involves decoding the digital signature of the new video BIOS with a corresponding public key stored with the system BIOS. Once the security check has been completed, the system BIOS writes the new video BIOS into a dedicated 64K flash-memory block. In addition to facilitating updates of the video BIOS independent of the system BIOS, "chipset patches" may be loaded onto a chipset along with the new video BIOS. A "chipset patch" is a code segment that may be loaded onto the chipset to fix problems on the chipset. The chipset patches are utilized to fix detected problems on the chipset by means of setting register bits within the chipset to proper values.

20 Claims, 2 Drawing Sheets

SYSTEM FOR UPDATING COMPUTER'S EXISTING VIDEO BIOS WITHOUT UPDATING THE WHOLE COMPUTER'S SYSTEM BIOS

FIELD OF THE INVENTION

This invention relates generally to a system and method of updating a computer system's BIOS (basic input/output system), and relates more particularly to a system and method of updating a video BIOS independently from the system BIOS.

BACKGROUND OF THE INVENTION

In currently-known computer systems which incorporate a graphics chip on the motherboard, the video BIOS is formed as part of the overall computer system's BIOS. For this reason, it is currently not possible to update the video BIOS independently from the system BIOS in the existing BIOS architectures. In the existing BIOS architectures, entirely new system BIOS must be loaded into the computer system in order to update the video BIOS.

The typical sequence of operation utilized to update the existing system BIOS involves the use of a "hot key sequence" and a floppy disk. In this typical sequence, the computer is initially turned off, and the floppy disk containing the new system BIOS is loaded into the floppy-disk drive. Next, the "hot key sequence" is pressed and held while the computer is turned on, which actuates the update of the existing system BIOS with the new system BIOS.

SUMMARY OF THE INVENTION

In accordance with the present invention, a computer system's existing video BIOS is updated independently without the need for updating the computer system's entire system BIOS, by transferring a new video BIOS contained on a floppy disk into a flash memory block dedicated for video-BIOS storage. The present invention incorporates a security measure to ensure that only new video BIOSs known to the system BIOS are used to update the existing video BIOS.

The video-BIOS update mode is entered through pressing and holding a "hot key sequence" and turning on the computer. Once the hot key sequence has been detected, the system BIOS reads the new video BIOS from the floppy disk and performs a security check to ensure that the new video BIOS contained on the floppy disk is known to the system BIOS. The security check involves decoding the digital signature of the new video BIOS with a corresponding public key stored with the system BIOS. Once the security check has been completed, the system BIOS writes the new video BIOS into memory, e.g., a dedicated 64K flash-memory block.

In addition to facilitating updates of the video BIOS independent of the system BIOS, "chipset patches" may be loaded onto a chipset along with the new video BIOS. A "chipset patch" is a code segment that may be run to fix problems on the chipset. The chipset patches are utilized to fix detected problems on the chipset by means of setting register bits within the chipset to proper values.

DETAILED DESCRIPTION OF THE INVENTION

Figure 1:
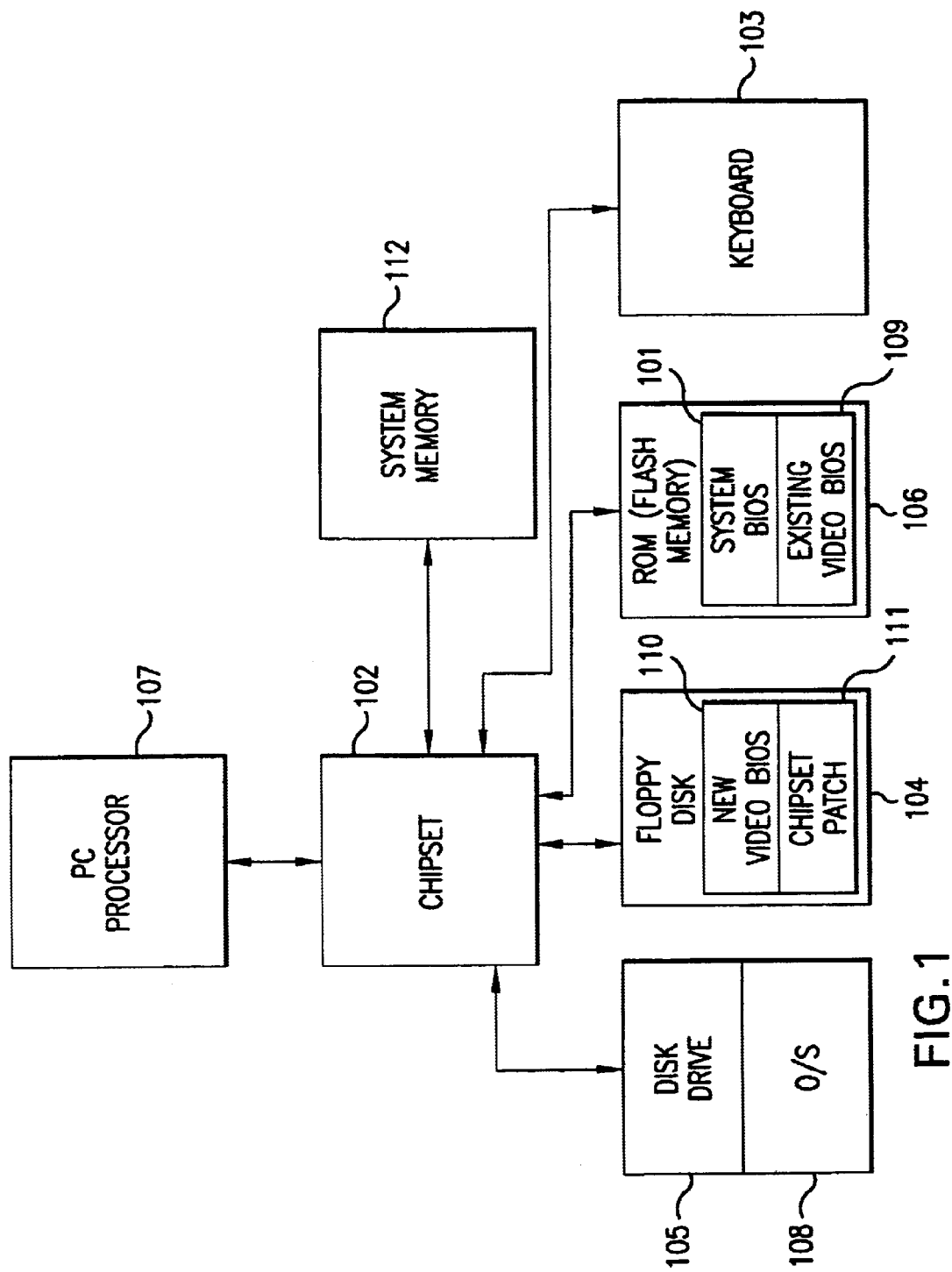
FIG. 1 is a diagram illustrating interaction amongst the basic PC components and the BIOS codes in accordance with the present invention.

In accordance with the present invention, an existing video BIOS 109 stored in a non-volatile memory chip 106 of a PC (personal computer) system is updated with a new video BIOS 110 contained on a floppy disk 104, which components are illustrated in FIG. 1 along with other basic components of the PC system. In addition to containing the new video BIOS, the floppy disk 104 may also contain a "chipset patch" 111 for fixing problems on a chipset 102, shown in FIG. 1. Both the chipset patch 111 and the chipset 102 will be explained in further detail below. The memory chip 106 may be a flash-memory chip containing a 64K memory block for the video BIOS and any chipset patch, but other memory devices and/or memory blocks may be utilized.

Figure 2:
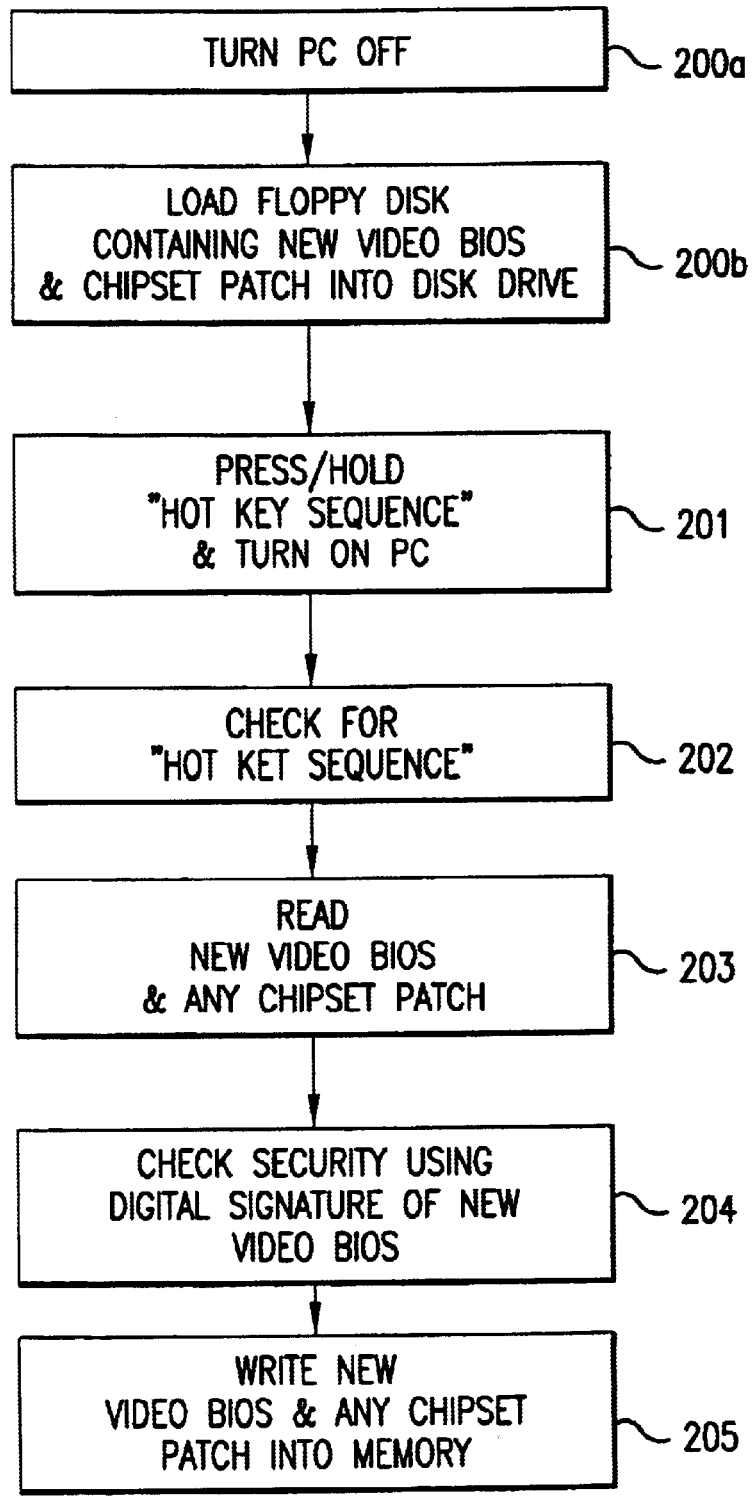
FIG. 2 is a flow chart illustrating the independent video-BIOS update methodology in accordance with the present invention.

The exemplary steps involved in the update mechanism in accordance with the present invention are illustrated in FIG. 2. The preliminary step before entering the video-BIOS update mode is turning off the PC, as indicated by step 200a. Next, in step 200b, the floppy disk 104 containing the new video BIOS 110 and, if desired, the chipset patch 111 is loaded into the disk drive 105. The video BIOS update is initialized by pressing and holding a "hot key sequence" on the keyboard 103 while turning on the PC, as indicated by step 201 of FIG. 2. Once the PC has been turned on, the first software which takes control of the PC is the system BIOS 101, shown in FIG. 1, which commences preliminary initialization of various components in the PC system, including the chipset 102, the memory chip 106 and a system memory 112. Chipset 102 is a logic chip which may contain a memory controller, I/O (input/output) controller and a graphics controller for the PC system, and the chipset 102 is linked with the processor 107, memory and I/O devices. As the system BIOS is initializing various PC components, the system BIOS checks for whether a "hot key sequence" on the keyboard 103 has been pressed by the user, as indicated by step 202 in FIG. 2. The "hot key sequence" is a combination of predetermined keys on the keyboard 103. Once the hot key sequence has been detected, the system BIOS reads the new video BIOS 110 and any chipset patch 111 from the floppy disk, as indicated by steps 203.

As indicated by step 204 in FIG. 2, the system BIOS 101 performs a security check to ensure that the new video BIOS 110 is known to the system BIOS. In accordance with the present invention, the security check in step 204 involves decoding an encrypted digital "signature" associated with the new video BIOS 110. The digital signature is a sequence of binary bits encrypted with a "private" key, and a corresponding "public" key programmed into the system BIOS ROM (read-only memory) is used to decode the digital signature. An exemplary embodiment of the digital signature may be a 1024-bit RSA® algorithm, but other digital signatures may be utilized. The matching private/public key pair enables verification of the new video BIOS 110 as a known video BIOS, e.g., a video BIOS supplied by a particular company, rather than a random software. Once the security check has been completed in step 204, the system BIOS 101 writes the new video BIOS 110 and any chipset patch 111 into the memory chip 106, as indicated by step 205 in FIG. 2. As an example, the memory chip 106 may be a flash-memory chip, and the new video BIOS 110 and the chipset patch 111 may be written into a dedicated 64K block within the flash memory chip.

Once the new video BIOS 110 has been written into the memory chip 106, the system BIOS 101 will reset the PC system and restart the preliminary initialization of various PC components. Once the preliminary initialization has been completed, the system BIOS 101 relinquishes control of the PC system to the new video BIOS 110 now residing in the memory chip 106. The video BIOS initializes the graphics sub-system of the PC and runs any chipset patch 111 which may have been written into the memory chip 106. The chipset patch 111 is a code segment that can be loaded via the presently-described, independent-update mechanism to fix detected problems on the chipset 102. The chipset patch 111 may be called by the video BIOS during its initialization sequence to fix chipset-related problems. The chipset patch 111 fixes the detected problems by means of setting register bits within the chipset to proper values. As an illustration, the chipset 102 may contain a register at memory location x having "0000h" value, and the chipset patch 111 may set the value of this memory location to "FFFFh," for example.

Once the new video BIOS 110 completes its initialization, the video BIOS relinquishes control back to the system BIOS 101. The system BIOS 101 then continues with the initialization of the PC, and when the initialization of the PC is complete, the system BIOS 101 relinquishes control of the PC to the operating system (O/S) 108.

The system and method in accordance with the present invention facilitate, and are particularly useful for updating a video BIOS in, a system architecture that utilizes a video controller that is separate from the video BIOS. Because the video BIOS is implemented as an independent and modularized unit, updates of the video controller may be easily achieved by means of the video-BIOS update mechanism in accordance with the present invention. Similarly, the present invention is particularly useful where the video BIOS is expected to be further developed and altered.

While the system and method according to the present invention have been described above in connection with specific embodiments and steps, it should be readily apparent to those of ordinary skill in the are that the above-described embodiments and steps are exemplary in nature since certain changes may be made thereto without departing from the teachings of the invention, and the exemplary embodiments and steps should not be construed as limiting the scope of protection for the invention as set forth in the appended claims. For example, while the new video BIOS for providing update has been described as being initially stored on a floppy disk, other memory media may be utilized. Similarly, while the new video BIOS has been described as being written into a flash memory, other memory media may be utilized. In addition, while the digital signature has been described as being a 1024-bit RSA® algorithm, other digital signatures may be utilized for providing security. Accordingly, the specification and the drawings are to be regarded in an illustrative, rather than restrictive, sense.

We claim:

1. A method of updating a computer's existing video BIOS with a new video BIOS, independent of the computer's system BIOS, without updating the computer's system BIOS, comprising:

initializing the computer;
   pressing a predetermined combination of keys on a keyboard while the computer is being initialized;
   performing, using said system BIOS, a security check on said new video BIOS to determine whether said new video BIOS is known to said system BIOS; and
   writing said new video BIOS into a memory in the computer, without updating the computer's system BIOS.

2. The method of claim 1, wherein said performing of the security check comprises checking a digital signature associated with said new video BIOS.

3. The method of claim 2, wherein said digital signature comprises an encrypted sequence of binary digits.

4. The method of claim 2, wherein said checking of the digital signature comprises decoding said digital signature with a stored public key.

5. The method of claim 4, wherein said system BIOS performs said security check upon detecting pressing of said predetermined combination of keys.

6. A method of simultaneously updating a computer's existing video BIOS with a new video BIOS and providing a chipset patch, independent of the computer's system BIOS, without updating the computer's system BIOS, comprising:

initializing the computer;
   pressing a predetermined combination of keys on a keyboard while the computer is being initialized;
   performing, using said system BIOS, a security check on said new video BIOS to determine whether said new video BIOS is known to said system BIOS; and
   loading said new video BIOS and said chipset patch into a memory in the computer, without updating the computer's system BIOS.

7. The method of claim 6, wherein said performing of the security check comprises checking a digital signature associated with said new video BIOS.

8. The method of claim 7, wherein said digital signature comprises an encrypted sequence of binary digits.

9. The method of claim 8, wherein said checking of the digital signature comprises decoding said digital signature with a stored public key.

10. The method of claim 9, wherein said system BIOS performs said security check upon detecting pressing of said predetermined combination of keys.

11. A computer-readable medium for storing a plurality of instruction sets for causing a computer system to perform an update of said system's video BIOS with a new video BIOS, independent of said system's system BIOS, without updating said system's system BIOS, in response to a predefined user-input, by:

performing, using said system BIOS, a security check on said new video BIOS to determine whether said new video BIOS is known to said system BIOS; and
   writing said new video BIOS into a memory in the computer, without updating the computer's system BIOS.

12. The computer-readable medium of claim 11, wherein said performing of a security check comprises reading a digital signature associated with said new video BIOS and decoding said digital signature with a stored public key.

13. A computer-readable medium for storing a plurality of instruction sets for causing a computer system to perform an update of said system's video BIOS with a new video BIOS and load a chipset patch, independent of said system's system BIOS, without updating said system's system BIOS, in response to a predefined user-input, by:

performing, using said system BIOS, a security check on said new video BIOS to determine whether said new video BIOS is known to said system BIOS; and
   writing said new video BIOS and said chipset patch into a memory in the computer, without updating the computer's system BIOS.

14. The computer-readable medium of claim 13, wherein said performing of a security check comprises reading a digital signature associated with said new video BIOS and decoding said digital signature with a stored public key.

15. A system for updating a computer's existing video BIOS with a new video BIOS, independent of said computer's system BIOS, without updating said computer's system BIOS, comprising:

an initialization button for resetting the computer;

a predetermined combination of keys on a keyboard for actuating an update of said existing video BIOS;

a first computer-readable medium storing at least said new video BIOS;

a second computer-readable medium; and said system BIOS for reading at least said new video BIOS and performing a security check on said new video BIOS to determine whether said new video BIOS is known to said system BIOS, and said system BIOS writing at least said new video BIOS into said second computer-readable medium if said new video BIOS is known to said system BIOS, without updating the computer's system BIOS.

16. The system of claim 15, wherein said new video BIOS has a digital signature associated therewith and said system BIOS has a stored public key associated therewith, and wherein said system BIOS performs said security check by decoding said digital signature with said public key.

17. The system of claim 16, wherein said first computer-readable medium comprises a floppy disk, said second computer-readable medium comprises a flash memory device, and wherein said digital signature comprises an encrypted sequence of binary digits.

18. The system of claim 15, wherein said first computer-readable medium further stores a chipset patch, and wherein said system BIOS further reads said chipset patch and writes said chipset patch into said second computer-readable medium.

19. The system of claim 18, wherein said new video BIOS has a digital signature associated therewith and said system BIOS has a stored public key associated therewith, and wherein said system BIOS performs said security check by decoding said digital signature with said public key.

20. The system of claim 19, wherein said first computer-readable medium comprises a floppy disk, said second computer-readable medium comprises a flash memory device, and wherein said digital signature comprises an encrypted sequence of binary digits.

* * * * *